Patented May 25, 1954

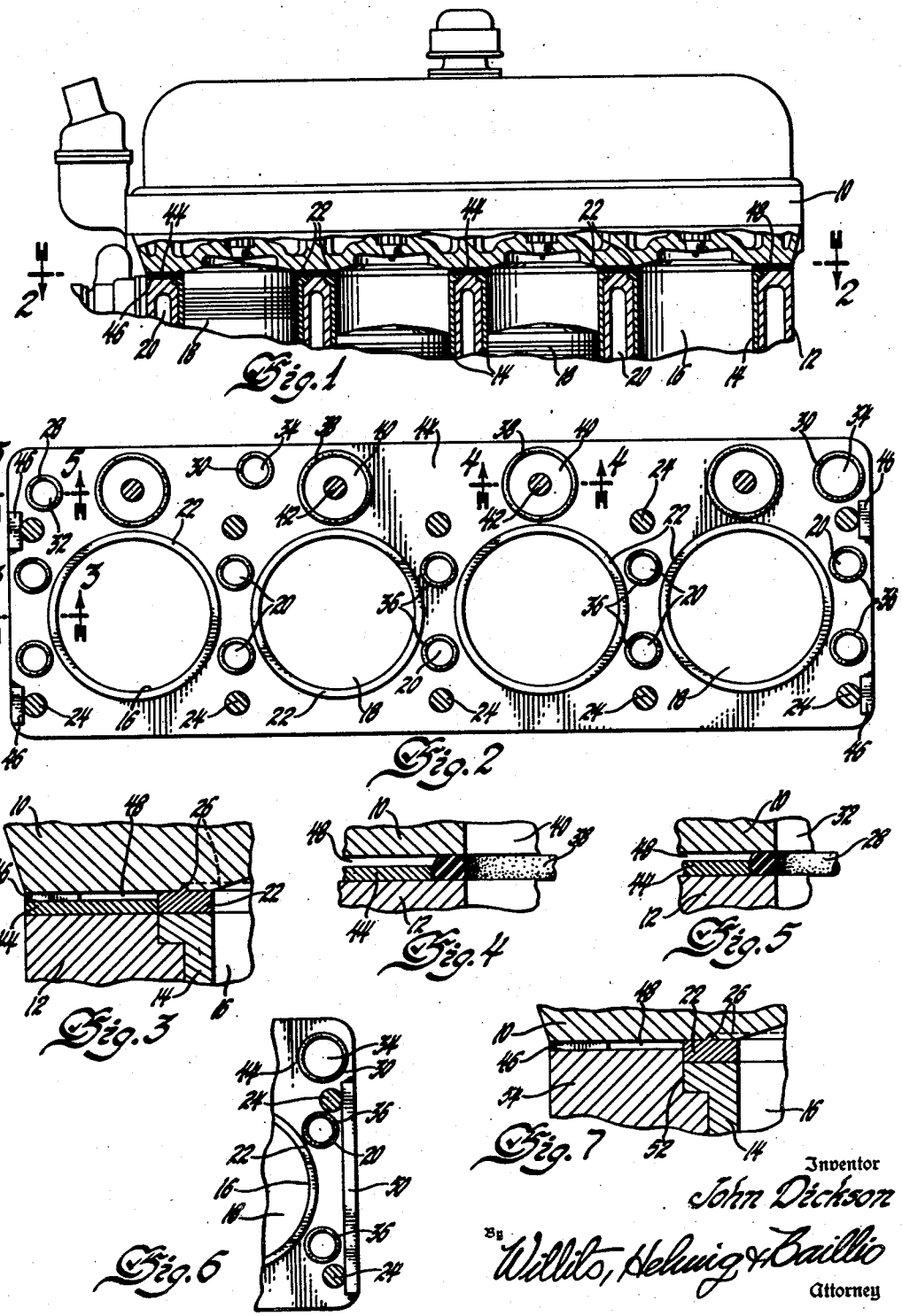

2,679,241

UNITED STATES PATENT OFFICE 2,679,241

CYLINDER HEAD GASKET CONSTRUCTION

John Dickson, Huntington Woods, Mich., assignor to General Motors Corporation, Detroit, Mich., a corporation of Delaware Application November 17, 1950, Serial No. 196,257

15 Claims. (Cl. 123—193)

This invention relates to a gasket construction and particularly to a gasket construction between the cylinder head and cylinder block of an internal combustion engine.

The laminated sheet type of gasket heretofore most frequently used between the cylinder head and the block in diesel engines, for example, has frequently permitted gas leakage from the cylinders to the water passages, as well as water and oil leakage. Such leakage results from the inadequate sealing contact between the adjacent head, gasket and cylinder block surfaces in the conventional construction because the effort expended in tightening down the bolts is wasted to a considerable extent in creating localized high pressure areas between the cylinder head and the completely gasketed block surface in the vicinity of the bolts. This non-uniform pressure distribution causes a type of distortion of the bottom surface of the head which precludes the possibility of obtaining adequate and uniform pressure around the various parts.

A principal object of the invention, therefore, is to provide a construction wherein pressure between the cylinder head of an internal combustion engine, the cylinder block and individual gaskets surrounding the various engine passages is uniformly concentrated at the gasketed areas to prevent any type of leakage. This and other objects are attained in accordance with the invention by providing a novel engine gasket construction wherein spring members or spacer pads are located between the cylinder head and the block to equalize the head flexure near the ports to be sealed, these spacer pads preferably being welded to the top surface of a locating plate or sheet near the ends of the head and block. Relatively soft gaskets are preferably seated on the cylinder block around the various ports and held in position by the locating plate. The gaskets are of sufficient size and compressibility to cause the cylinder head, upon tightening of the bolts securing the head and block together, to tend to flex longitudinally against the gaskets.

With this engine gasket construction, the cylinder head is not pulled down into uniform surface engagement with the cylinder block, but the flexure of the cylinder head permits the pressure due to tightening the bolts to be concentrated on the various individual gaskets, thereby resulting in effectively sealing all ports to prevent gas, oil, and water leakage. One of the features of this design is that equally preloading the bolts with a torque wrench results in uniform pressure application to gasket areas performing corresponding sealing functions.

A further object of the invention is to provide a gasket construction for an internal combustion engine wherein the cylinder head and the block, or the head and a locating plate seated on the upper face of the block, are spatially separated. This requirement is satisfied in the present invention by an arrangement in which the only contact is between the head and the gaskets and the head and the spacer members. The clearance thus provided between the cylinder head and the spacer plate permits thermal conditions to be relieved by the resilience of the head and the bolts, the head following the gaskets when thermal stresses so demand. Moreover, the detrimental effects of any possible gas leakage from the cylinders are substantially reduced by this construction because the aforementioned clearance permits any gases leaking from the cylinders to freely escape out the side of the engine between the cylinder block and the head and prevents their leaking into the cooling water.

Other objects and advantages of this invention will more fully appear from the following description of the preferred embodiment of the invention shown in the accompanying drawing, in which:

Figure 1 is a longitudinal elevational view, with parts broken away and in section, of a diesel engine embodying the present invention;

Figure 2 is a sectional view along the line 2—2 of Figure 1 showing the locating plate and gasket assembly;

Figure 3 is an enlarged fragmentary sectional view along the line 3—3 of Figure 2 showing the gasket structure for sealing the cylinders;

Figure 4 is an enlarged fragmentary sectional view along the line 4—4 of Figure 2 showing the gasket arrangement for sealing the push rod ports;

Figure 5 is an enlarged fragmentary sectional view along the line 5—5 of Figure 2 showing the sealing construction for the various oil ports;

Figure 6 is a fragmentary elevational view of one end of the locating plate and gasket assembly showing a modification of the spacer pad arrangement shown in Figure 2 of the drawing; and Figure 7 is a fragmentary sectional view similar to Figure 3 and showing a modification of the invention wherein recessing of the cylinder block eliminates the need for a locating plate.

Referring more specifically to the drawing, Figure 1 shows a diesel engine having a cylinder head 10 and a cylinder block 12. Liners or sleeves 14 are fitted within the cylinder block to provide cylinder bores 16 in which pistons 18 reciprocate, these liners being shown as extending upwardly to the top of the block. Water passages 20 are formed within the cylinder block for cooling the engine.

As shown in Figures 1 through 3, annular gaskets 22 are seated upon the upper end surfaces of the cylinder liners 14 so as to form an extension thereof. These gaskets are preferably of soft copper so that tightening of the bolts or studs 24, which are used to clamp the cylinder head to the block, causes a portion of the copper to be squeezed into an annular notch or groove 26 formed in the lower surface of the block adjacent each cylinder gasket. This arrangement effectively seals the cylinder bores to prevent leakage of the gases from the cylinders.

Smaller annular sealing gaskets 28 and 30, which are preferably in the form of rubber O rings whose details of construction are best shown in Figure 5, are similarly seated on the cylinder block around the oil supply port 32 and the oil drain ports 34, respectively. Other rubber O rings 36 of like design are also provided around the openings to the cooling water passages 20 in the head, while larger rubber O rings 38, shown in Figure 4, are seated on the block to seal the ports 40 through which the push rods 42 reciprocate.

Positioned between the cylinder head 10 and the cylinder block 12, and forming part of the block assembly, is a spacer or locating plate 44, which is preferably constructed of steel. This plate is provided with openings corresponding to the appropriate cylinder, push rod, oil, and water ports or passages to permit communication between the head and block portions of these ports. These openings in the locating plate are formed of sufficiently larger diameter than those of the concentric communicating ports in the cylinder head and block to enable the various gaskets to be seated on the block within the appropriate locating plate openings and to be maintained in position thereby. The dimensional arrangement of these parts is shown to be such that the internal diameters of each gasket and its corresponding port are equal.

In accordance with the invention, spacing members or spacer pads 46, also preferably of steel, are provided between the cylinder head and the block to equalize the head deflection near the ports to be sealed upon tightening the bolts 24. As shown in Figures 1 through 3, these spacer pads are located at the ends of the locating plate 44 and preferably welded to the top surface thereof immediately adjacent the end bolts.

The copper gaskets 22 for sealing the cylinders preferably extend from 0.003 inch to 0.006 inch higher than the spacer pads before the bolts 24 are tightened. However, the pressure due to tightening of the bolts compresses these gaskets so as to cause their thickness to be slightly less than the combined thicknesses of the locating plate 44 and the spacer pads 46. This compressibility of the soft copper and rubber gaskets is therefore such that tightening the bolts will tend to longitudinally flex the cylinder head, which is supported at the ends by spacer pads 46, against the gaskets. As a consequence, the head is not pulled down solidly to the cylinder block, but the pressure is concentrated on the various gaskets, thereby resulting in effectively sealing the ports to prevent water, oil, and gas leakage. In this manner, the present invention provides an ideal design in which equally preloading the bolts with a torque wrench results in approximately equal pressure on all gaskets which perform corresponding sealing functions.

It will be noted that the cylinder head and locating plate do not actually touch, the only contact being between the head and the gaskets. The clearance 48 thereby provided between the head and the locating plate is preferably in the order of 0.025 inch and allows thermal conditions to be relieved by the resilience of the head and bolts, the head being permitted to follow the gaskets when thermal stresses so demand. Moreover, this clearance permits any gases which might leak from the cylinders to escape out the sides of the engine between the cylinder head and the block, thus eliminating any danger of these gases leaking into the adjacent cooling water passages 20.

As shown in the modification of Figure 6, it is possible to use a single bar 50 extending substantially the width of the locating plate near each end thereof as a substitute for each pair of spacer pads shown in Figures 2 and 3. Such a construction is permissible where, as is the case in the arrangement shown, it is not essential, in view of the distribution of the various ports and gaskets, to transversely flex the head in order to seal these ports. However, in some instances where the various gaskets are located in positions different from those shown, it would be advisable to provide separate, laterally spaced spacer pads at positions most advantageous to provide any desirable transverse flexing of the head.

As an alternative to the locating plate design shown in Figures 2 through 6, recesses may be formed in the cylinder block itself to locate the various gaskets and provide the proper dimensional relationship between the spacing members or spacer pads and the compressible sealing gaskets. The modification of the cylinder block shown in Figure 7 is an example of this construction, recesses 52 being formed in the block 54 adjacent the cylinder ports to locate the cylinder gaskets 22. Similarly, the push rod, water, and oil gaskets may be located by recesses in the block itself, the spacer pads 46 being preferably either welded directly to the block or machined from the block.

While the described embodiment of the present invention constitutes a preferred form, it is to be understood that other forms might be adopted, all coming within the scope of the following claims.

I claim:

1. In an internal combustion engine, a cylinder head assembly and a cylinder block assembly each having a port therein to provide communication therebetween, and a gasket interposed between said head assembly and said block assembly around said port, one of said assemblies being provided with spacing portions near the ends thereof to permit flexure of the head upon securing the head assembly to the block assembly for uniformly distributing the compressive forces applied to said gasket.

2. In an internal combustion engine assembly including a cylinder block and a cylinder head each having ports therein to provide communication therebetween, a plurality of gaskets positioned between said head and said block for sealing said ports, and a plurality of spacing members interjacent said head and said block and distributed therebetween to provide for a predetermined distortion of the adjacent face of said head when said head is secured to said block for uniformly compressing the gaskets therebetween.

3. In an internal combustion engine, a cylinder head and a cylinder block assembly each having ports therein to provide communication therebetween, a plurality of gaskets positioned between the head and the block around the ports, and spacing members affixed to the upper face of the block assembly between the head and the block assembly near the ends thereof for flexing the head to uniformly compress the gaskets when the head and block assembly are secured together.

4. In an internal combustion engine, the combination of a cylinder head and a cylinder block secured together and provided with communicating ports, a plurality of gaskets interposed between the head and the block and surrounding the registering openings of said ports, and spacing members positioned between the head and the block near the ends thereof, the head being seated only on said spacing members and gaskets and spatially separated from the block thereby to permit flexure of the head to compress the gaskets when the head is secured to the block.

5. In an internal combustion engine, a cylinder head and a cylinder block having communicating ports, compressible gaskets disposed between the head and the block and registering with said ports, and a plurality of spacer pads formed on the upper face of the block between the head and the block adjacent the ends thereof, the head being seated only on the spacer pads and gaskets and forcibly flexed to compress the gaskets when the head is secured to the block.

6. In an internal combustion engine, the combination of a cylinder head and a cylinder block secured together and provided with communicating ports, a plurality of gaskets positioned between the head and the block around said ports for the sealing thereof, said cylinder block having its face adjacent said head recessed to locate said gaskets, and spacing members between adjacent faces of the head and the block near the ends thereof for flexing the head firmly against the gaskets upon tightly securing said head and block together.

7. In an internal combustion engine, a cylinder head and a cylinder block secured together by bolts and provided with communicating ports, the face of said block adjacent said head and immediately surrounding said ports having recesses therein, a plurality of compressible annular gaskets positioned in said recesses between the head and the block, and a plurality of metallic spacer pads affixed to the recessed face of said block near the ends thereof for flexing the head against the gaskets to compress said gaskets upon tightening of the bolts, said gaskets being of greater thicknesses than said recesses to provide a substantially uniform clearance between the head and the block.

8. In an internal combustion engine, the combination of a cylinder head, a cylinder block, a plurality of annular sealing gaskets positioned between said head and block, and a metallic locating plate interposed between said head and block for positioning said gaskets, said head, block and locating plate being provided with communicating openings concentric with said gaskets, the surface of said locating plate adjacent the head having a plurality of metallic spacer pads affixed thereto near the ends of said plate to spatially separate the head and the plate, wherein assembling the head on the block permits the head to contact only the spacer pads and gaskets.

9. In an internal combustion engine having a cylinder head secured to a cylinder block assembly, said head and block assembly being provided with communicating ports, a locating plate positioned between said block assembly and head and having openings coaxial with the ports therein, a plurality of annular gaskets seated on the block assembly and encircling the ports, said gaskets being maintained in position by the openings in said plate, and a plurality of spacer pads interposed between the head and the locating plate near the ends thereof, said gaskets and pads spatially separating the head from the plate to permit flexing of the head against the gaskets upon securing the head tightly to the block assembly to thereby seal the ports.

10. In an internal combustion engine having a cylinder head secured to a cylinder block assembly, said head and block assembly being provided with communicating ports, a gasket construction therefor comprising a plurality of compressible gaskets positioned between the cylinder head and the cylinder block assembly for sealing said ports, a locating plate interjacent the cylinder head and the cylinder block assembly and having openings therein for aligning the gaskets with the ports, said locating plate being of lesser thickness than said gaskets and having spacing members affixed to its upper surface near each end thereof to cause the head to longitudinally flex against the gaskets when the head is tightly secured to the block assembly, said head being seated solely upon said spacing members and gaskets.

11. In an internal combustion engine having a cylinder head and a cylinder block secured together by bolts, said head and block provided with communicating ports, a plurality of annular sealing gaskets disposed between the head and block and encircling said ports, a metallic locating plate positioned between said head and block and provided with openings therein to position said gaskets and to afford communication between the ports in the head and block, and metallic spacer pads affixed to the locating plate near the ends thereof and spatially separating the head from the plate to permit the tightening of the bolts to longitudinally flex the head against the annular gaskets for sealing the ports, the combined thicknesses of said spacer pads and locating plate being substantially equal to the thicknesses of said gaskets.

12. In a diesel engine having a cylinder block and a cylinder head secured together by bolts and each provided with communicating passages forming cylinder bores and oil, water and push rod ports, a gasket construction comprising metallic gaskets positioned between the head and the block around the cylinder bores, compressible gaskets between the head and the block in substantial registration with the water, oil, and push rod ports, a locating plate interposed between the head and the block and provided with openings therein coaxial with said bores and said ports in the block and the head, said openings circumscribing the gaskets and maintaining them in alignment with the ports, metallic spacer pads affixed to the upper surface of the locating plate near the ends thereof, said spacer pads and gaskets being of greater thickness than the thickness of the locating plate to permit flexure of the head against the gaskets upon tightening of the bolts for sealing the bores and ports in the head and the block.

13. In a diesel engine, a cylinder block and a cylinder head bolted thereto, said block and head each provided with communicating passages forming cylinder bores and water, oil, and push rod ports, soft copper gaskets positioned between the head and block concentric with the cylinder bores, rubber gaskets seated on the block and substantially registering with the oil, water, and push rod ports, a locating plate interposed between the head and the block and provided with openings therein in which the copper and rubber gaskets are positioned, said copper and rubber gaskets each being of greater thickness than the thickness of the locating plate, a pair of laterally spaced metallic spacer pads welded to the upper surface of the locating plate adjacent each end, the adjacent surfaces of the cylinder head and the plate surrounding the copper and rubber gaskets being spatially separated to permit said gaskets to be compressed between the head and the block by longitudinal flexure of the head upon tightening of the bolts for sealing said bores and said ports.

14. In a diesel engine, a cylinder block provided with water, oil, and push rod ports, metallic liners fitted within said block to form cylinder bores, a cylinder head secured to the block by bolts and provided with passages communicating with the bores and ports in the head, a plurality of annular soft copper gaskets each positioned on the upper edge of each liner between the head and the block, a plurality of rubber O rings disposed between the head and the block and registering with the oil, water, and push rod ports, a locating plate interjacent the head and the block and provided with openings in which the copper gaskets and O rings are positioned in alignment with said ports, said gaskets and O rings each being of greater thickness than the thickness of the locating plate, a pair of laterally spaced spacer pads welded to the upper surface of the locating plate adjacent each end thereof, the combined thicknesses of said spacer pads and locating plate being approximately equal to the thicknesses of the copper gaskets and O rings to permit compression of said gaskets and O rings by the longitudinal flexure of the head due to tightening of the bolts for sealing the cylinder bores and ports in the head and the block, a clearance being provided between adjacent surface portions of the head and locating plate surrounding the copper gaskets and O rings to relieve thermal conditions, the portion of the surface of the head in contact with the copper gaskets being provided with annular notches into which the soft copper is squeezed upon compression of the gaskets to more effectively seal the cylinder bores against the escape of gases therefrom.

15. In an internal combustion engine having a cylinder head secured to a cylinder block assembly, said head and block assembly being provided with communicating ports, a locating plate interjacent the cylinder head and the cylinder block assembly and having openings generally coaxial with said ports, said openings extending radially outwardly beyond the walls of said ports, and a plurality of gaskets positioned within said openings between the cylinder head and cylinder block assembly, said gaskets abutting the plate edges which define said openings and being of greater thickness than said locating plate to spatially separate the head from the plate.

References Cited in the file of this patent

UNITED STATES PATENTS

| Number | Name | Date |
| --- | --- | --- |
| 1,424,226 | Wishart | Aug. 1, 1922 |
| 1,847,729 | Shaw | Mar. 1, 1932 |
| 1,880,643 | Woolson | Oct. 4, 1932 |
| 2,384,386 | Malmberg | Sept. 4, 1945 |
| 2,412,719 | Dausmann | Dec. 17, 1946 |